United States Patent
Hu et al.

(10) Patent No.: US 11,373,060 B2
(45) Date of Patent: Jun. 28, 2022

(54) TRAINING METHOD FOR VIDEO STABILIZATION AND IMAGE PROCESSING DEVICE USING THE SAME

(71) Applicant: Novatek Microelectronics Corp., Hsinchu (TW)

(72) Inventors: Jen-Huan Hu, Taipei (TW); Wei-Ting Chen, Tainan (TW); Yu-Che Hsiao, Kaohsiung (TW); Shih-Hsiang Lin, Hsinchu County (TW); Po-Chin Hu, Hsinchu County (TW); Yu-Tsung Hu, Changhua County (TW); Pei-Yin Chen, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 133 days.

(21) Appl. No.: 16/882,692

(22) Filed: May 25, 2020

(65) Prior Publication Data

US 2021/0365729 A1    Nov. 25, 2021

(51) Int. Cl.
*G06K 9/62* (2022.01)
*G06N 3/04* (2006.01)
*G06T 3/40* (2006.01)
*G06N 3/08* (2006.01)
*G06V 20/40* (2022.01)

(52) U.S. Cl.
CPC ......... *G06K 9/6256* (2013.01); *G06K 9/6215* (2013.01); *G06N 3/0454* (2013.01); *G06N 3/08* (2013.01); *G06T 3/4046* (2013.01); *G06V 20/41* (2022.01); *G06V 20/46* (2022.01)

(58) Field of Classification Search
CPC .... G06K 9/6256; G06K 9/6215; G06V 20/46; G06V 20/41; G06N 3/0454; G06N 3/08; G06T 3/4046
USPC ........................................................ 382/157
See application file for complete search history.

(56) References Cited

U.S. PATENT DOCUMENTS

2021/0035273 A1* 2/2021 Deng ...................... G06T 5/009

OTHER PUBLICATIONS

Chen, Learning Stereo High Dynamic Range Imaging From a Pair of Cameras With Different Exposure Parameters, IEEE (Year: 2020).*
Xu, Deep Video Inverse Tone Mapping, IEEE (Year: 2019).*
Huo, Physiological inverse tone mapping based on retina response Springer-Verlag (Year: 2013).*
Lee, Deep Recursive HDRI: Inverse Tone Mapping using Generative Adversarial Networks (Year: 2018).*

* cited by examiner

*Primary Examiner* — Mark Roz
(74) *Attorney, Agent, or Firm* — JCIPRNET

(57) ABSTRACT

A training method for video stabilization and an image processing device using the same are proposed. The method includes the following steps. An input video including low dynamic range (LDR) images is received. The LDR images are converted to high dynamic range (HDR) images by using a first neural network. A second neural network for video stabilization is trained to generate stabilized HDR images in a time-dependent manner.

20 Claims, 5 Drawing Sheets

TRAINING METHOD FOR VIDEO STABILIZATION AND IMAGE PROCESSING DEVICE USING THE SAME

TECHNICAL FIELD

The disclosure relates to a training method for video stabilization and an image processing device using the same.

BACKGROUND

Algorithms attempted for image enhancement such as image sharpening and high dynamic range imaging are mostly leveraged in a single-image approach. However, since the continuity between consecutive images has not been addressed in such algorithms, different adjustments would be given to different images based on individual color and light intensity. When all the adjusted images are consecutively played back as video, visible flickering would occur due to the aforesaid different adjustments, thereby producing unstable video.

SUMMARY OF THE DISCLOSURE

A training method for video stabilization and an image processing device using the same are proposed.

According to one of the exemplary embodiments, the method includes the following steps. An input video including low dynamic range (LDR) images is received. The LDR images are converted to high dynamic range (HDR) images by using a first neural network. A second neural network for video stabilization is trained to generate stabilized HDR images in a time-dependent manner.

According to one of the exemplary embodiments, the image processing device includes a memory circuit and a processing circuit. The memory circuit is configured to store data. The processing circuit is configured to receive an input video including LDR images, convert the LDR images to HDR images by using a first neural network, and train a second neural network for video stabilization according to the LDR images and the HDR images to generate stabilized HDR images in a time-dependent manner.

In order to make the aforementioned features and advantages of the disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
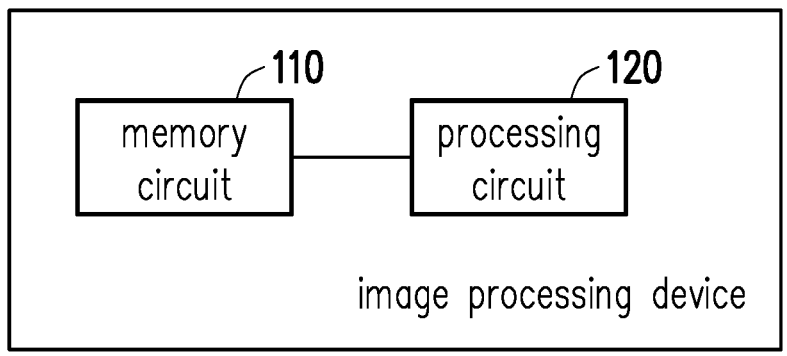
FIG. 1 illustrates a schematic diagram of a proposed image processing device in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed image processing device in accordance with one of the exemplary embodiments of the disclosure. All components of the image processing device and their configurations are first introduced in FIG. 1. The functionalities of the components are disclosed in more detail in conjunction with FIG. 2.

Referring to FIG. 1, an image processing device 100 would include a memory circuit 110 and a processing circuit 120 coupled thereto in the present exemplary embodiment. The image processing device 100 may be implemented as an integrated circuit (IC) or a computer system. The memory circuit 110 would be configured to store programming codes, device configurations, data, and so forth and may be implemented using any memory technology. The processing circuit 120 would be configured to implement functional elements of the proposed method in the following exemplary embodiments.

Figure 2:
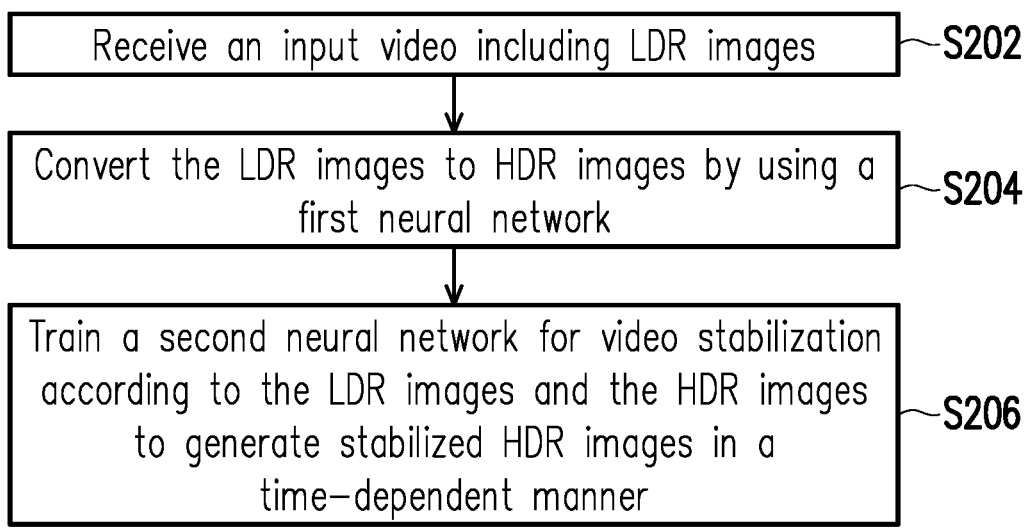
FIG. 2 illustrates a flowchart of a proposed training method for video stabilization in accordance with one of the exemplary embodiments of the disclosure.

FIG. 2 illustrates a flowchart of a proposed training method for video stabilization in accordance with one of the exemplary embodiments of the disclosure. The steps of FIG. 2 could be implemented by the proposed image processing device 100 as illustrated in FIG. 1 but not limited thereto.

Referring to FIG. 2 in conjunction to FIG. 1, the processing circuit 120 of the image processing device 100 would receive an input video including LDR images (Step S202). Herein, the input video may be received from the internet or other electronic devices via a communication interface either through wire or wireless transmission as known per se. It is assumed that images forming the input video may be in an LDR format in a variety of color spaces such as RGB space, LUV space, and so forth.

Next, the processing circuit 120 would convert the LDR images to HDR images by using a first neural network (Step S204). The HDR images may represent a greater dynamic range of color and brightness that can be perceived by human visual perception as opposed to the LDR images. The first neural network may be any existing neural network architecture suitable to perform conversion from the LDR images to HDR images. For illustrative purposes, the first neural network may be a HDRNet model (Deep Bilateral Learning for Real-Time Image Enhancement) available at Google's open source. However, image conversion of the HDRNet architecture is constructed based on local, global, and content-dependent decisions of LDR-HDR image pairs with no time-dependency. The HDR images produced by the first neural network would result in visible flickering during video playback.

To solve the aforesaid prominent issue, the processing circuit 120 would train a second neural network for video stabilization according to the LDR images and the HDR images to generate stabilized HDR images in a time-dependent manner (Step S206). The HDR images generated by the first neural network may be stabilized by using time-dependent LDR images through a deflickering process, and thereby outputting stabilized HDR images without flickering artefacts (or with reduced flickering artefacts) as well as training the second neural network for video stabilization. More details of Step S206 would be provided hereinafter.

A neural network model can learn a mapping from inputs to outputs from samples and the choice of a loss function can match the framing of the specific predictive modeling problem. In general, a loss function maps a set of parameter values for the network onto a single scalar value indicating how well these parameters accomplish the task the network carries out. That is, the loss term herein would be treated as the loss function.

In one exemplary embodiment, most realistically, the main objective would be to minimize the loss term for deflickering purposes. This means that the loss function of the second neural network may be constructed based on a loss term due to flickering.

The processing circuit 120 would perform a feature extraction process to obtain features based on the LDR images and the HDR images and train the second neural network for video stabilization based on the loss function by minimizing the loss of the loss function (referred to as "loss value" hereinafter). Note that the loss value would depend upon the features that indicate a difference between image variation of the LDR images and image variation of the HDR images. The loss value would have a positive correlation with a degree of the aforesaid difference. Moreover, in the deflickering process, the HDR images have a flickering degree in positive correlation with that of the LDR images. When no flickering occurs in consecutive LDR images, no flickering would be expected to occur in corresponding consecutive HDR images either. On the other hand, when apparent brightness variation exists in consecutive LDR images, there is no need to suppress brightness variation in corresponding consecutive HDR images. More details can be referred to the descriptions in connection with FIGS. 3 and 4.

In another exemplary embodiment, the reward term feedback from an HDR classifier would also be considered in the loss function. This means that the loss function of the second neural network may be further constructed based on a reward term which is feedback from a HDR classifier.

Herein, the HDR classifier would be constructed according to the LDR images and the HDR images, and the stabilized HDR images would be classified by using the HDR classifier to generate a reward value, where the reward value would indicate whether the stabilized HDR images have LDR characteristics and could be treated as a penalty.

The reward value (and so as the loss value of the loss function) would be lower when the stabilized HDR images have higher HDR characteristics than the LDR images. More details can be referred to the descriptions in connection with FIG. 5.

In another exemplary embodiment, the loss value of the loss function would further depend upon a similarity of the stabilized HDR images to the HDR images in a pixel domain. The loss function has a negative correlation with a degree of the similarity of the stabilized HDR images to the HDR images. The loss value of the loss function would be lower when the similarity of the stabilized HDR images to the LDR images is higher.

In another exemplary embodiment, the processing circuit 120 may further compute a motion vector of a moving object in the LDR images and train the second neural network for video stabilization according to the LDR images, the HDR images, and the motion vector in the time-dependent manner. Herein, the processing circuit 120 may perform a deflickering process on the HDR images according to the LDR images in the time dependent manner and the motion vector to generate the stabilized HDR images, where the deflickering process herein may be an adaptive correction on a brightness of the moving object in the HDR images based on the motion vector.

In summary, the loss function of the second neural network in some embodiments may be constructed based on at least one of the following three terms: (1) a difference term which reflects a difference between golden data (clean and validated data) and an image generated by the second neural network during training; (2) a reward term which is feedback from a HDR classifier; and (3) a loss term due to flickering.

For illustrative purposes, according to a specific embodiment in which the three terms are all considered, the loss function may be represented as Eq. (1):

$$L \propto \omega_{pixel}(\text{golden}-\text{prediction}) + \omega_{HDR}(\text{discriminatorAI}(\text{prediction,inLDR})) + \omega_{deflicker}(\text{Temporal Smoothness}) \quad \text{Eq. (1)}$$

where
$$\text{prediction} \propto \text{StablizerHDRnet(inLDR)}.$$
$$\text{Temporal Smoothness} \propto \text{abs}(\text{now}_{loss} - \text{pre}_{loss}) + \text{abs}(\text{next}_{loss} - \text{now}_{loss}).$$

Note that $\text{pre}_{loss}$ is a mean square error between a previous golden image and a previous LDR image, $\text{now}_{loss}$ is a mean square error between a current HDR image subject to a deflickering process and a current LDR image, and $\text{next}_{loss}$ is a mean square error between a next golden image and a next LDR image. These terms may be represented as follows, $$\text{pre}_{loss} = \text{mean}(\text{square}(\text{golden}_{pre} - \text{LDR}_{pre}))$$

$$\text{now}_{loss} = \text{mean}(\text{square}(\text{deflicker network output} - \text{LDR}_{now}))$$

$$\text{next}_{loss} = \text{mean}(\text{square}(\text{golden}_{next} - \text{LDR}_{next})).$$

As mentioned above, the loss function of the second neural network may be constructed based on a loss term due to flickering. A feature extraction process can be performed to obtain features based on the LDR images and the HDR images and train the second neural network for video stabilization based on the loss function by minimizing the loss of the loss function or the loss value. The loss value would be designed to depend upon the features that indicate a difference between image variation of the LDR images and image variation of the HDR images.

Figure 3:
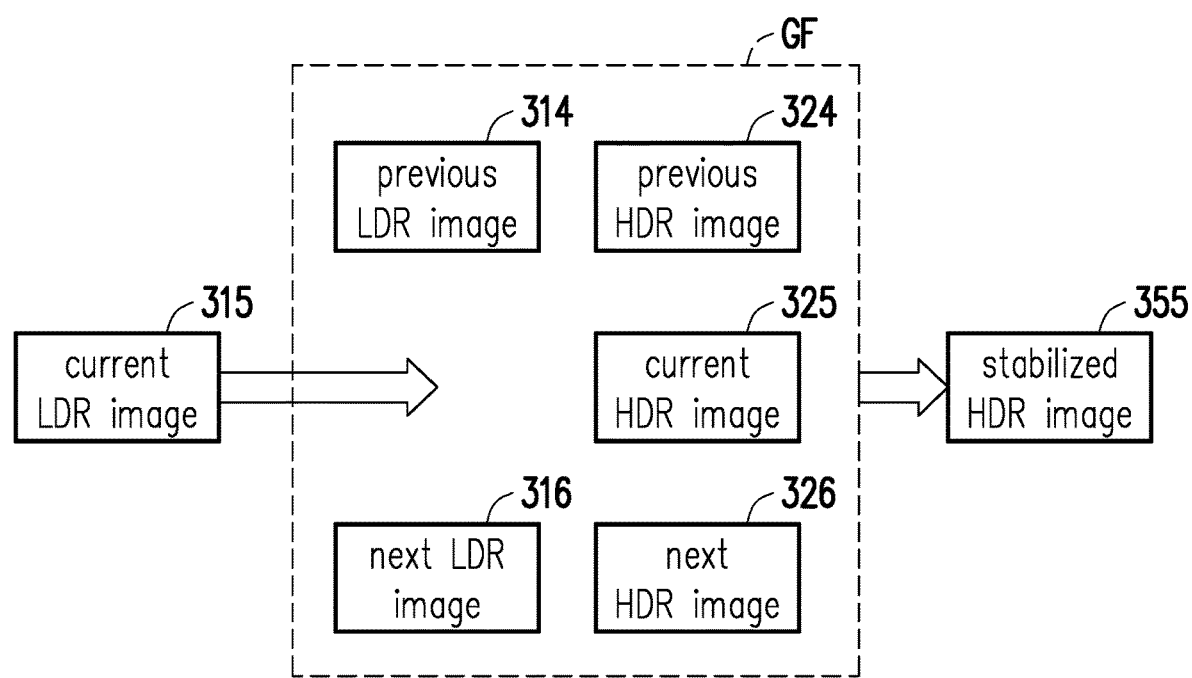
FIG. 3 illustrates a functional diagram of a proposed deflickering process in accordance with one of the exemplary embodiments of the disclosure.

For better comprehension, FIG. 3 illustrates a functional diagram of a proposed deflickering process in accordance with one of the exemplary embodiments of the disclosure. As shown in FIG. 3, the features can include features of at least one non-current LDR image adjacent to a current LDR image of the LDR images; and features of at least one non-current HDR image adjacent to a current HDR image of the HDR images, wherein the current HDR image corresponds to the current LDR image.

Referring to FIG. 3 in conjunction to FIG. 1, once receiving a current LDR image 315 in the LDR images, the processing circuit 120 would perform a global feature extraction process GF to generate a corresponding current stabilized HDR image 355 based on features of at least one non-current LDR image adjacent to the current LDR image 315 of the LDR images as well as features of at least one non-current HDR image adjacent to a current HDR image 325 of the HDR images. For example, the current stabilized HDR image 355 may be generated with reference to a previous LDR image 314 preceding the current LDR image 315 and a next LDR image 316 following the current LDR image 315 as well as the current HDR image 325, a previous HDR image 324 preceding the current HDR image 325, and a next HDR image 326 following the current HDR image 325. That is, the current stabilized HDR image 355 would be generated based on preceding and following LDR images and HDR images.

Figure 4:
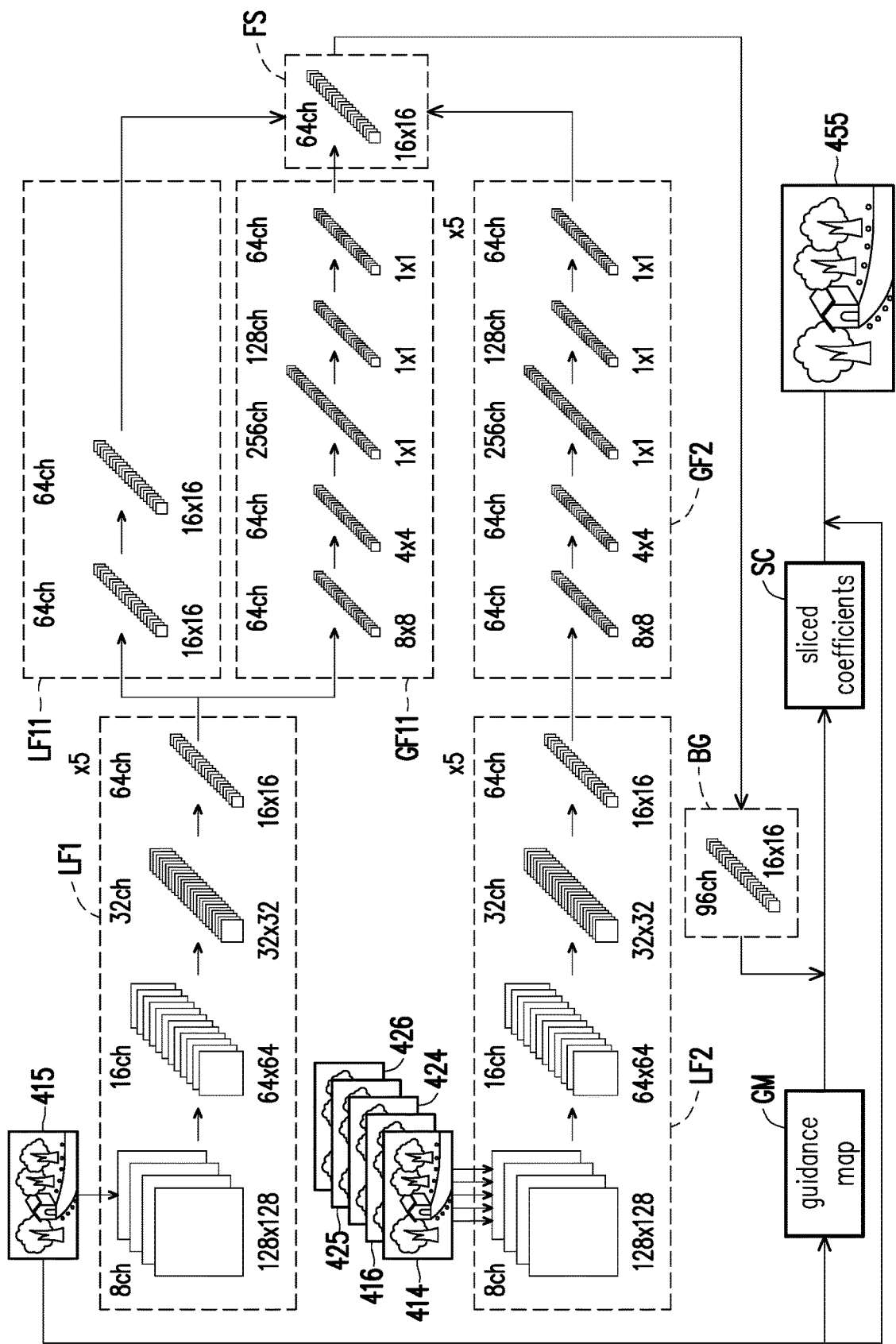
FIG. 4 illustrates a functional diagram to describe an architecture of a second neural network in accordance with an exemplary embodiment of the disclosure.

FIG. 4 illustrates a functional diagram to describe an architecture of a second neural network for illustrating the feature extraction process in accordance with an exemplary embodiment of the disclosure.

Referring to FIG. 4, when a current LDR image 415 is received, it is down-sampled to extract feature information such as low-level features LF1 for local features LF11 and global features GF11 with various batch sizes (e.g., 128×128 to 1×1) and channels (e.g., 8ch to 256ch). In various implementations, the feature information may include local features and/or global features as design required. Also, a previous LDR image 414, a next LDR image 416, a previous HDR image 424, a current HDR image 425, and a next HDR image 426 are received and down-sampled to extract low-level features LF2 for global features GF2 with various batch sizes (128×128 to 1×1) and channels (8ch to 256ch) as well. Fusion FS is performed based on the local features LF11, the global features GF11, and the global features GF2 to obtain a bilateral grid of coefficients BG. On the other hand, the current LDR image 415 is also fed to a pixel-wise network to obtain a guidance map GM. The bilateral grid of coefficients BG with a size of 16×16 and 96 channels would be up-sampled to sliced coefficients SC according to the guidance map GM. These sliced coefficients SC are then applied to the current HDR image 425 to produce a stabilized HDR image 455.

In another exemplary embodiment, the reward term feedback from an HDR classifier would also be considered in the loss function. Herein, the HDR classifier would be constructed according to the LDR images and the HDR images, and the stabilized HDR images would be classified by using the HDR classifier to generate a reward value, where the reward value would indicate whether the stabilized HDR images have LDR characteristics and could be treated as a penalty. The reward value (and so as the loss value of the loss function) would be lower when the stabilized HDR images have higher HDR characteristics than the LDR images.

Figure 5:
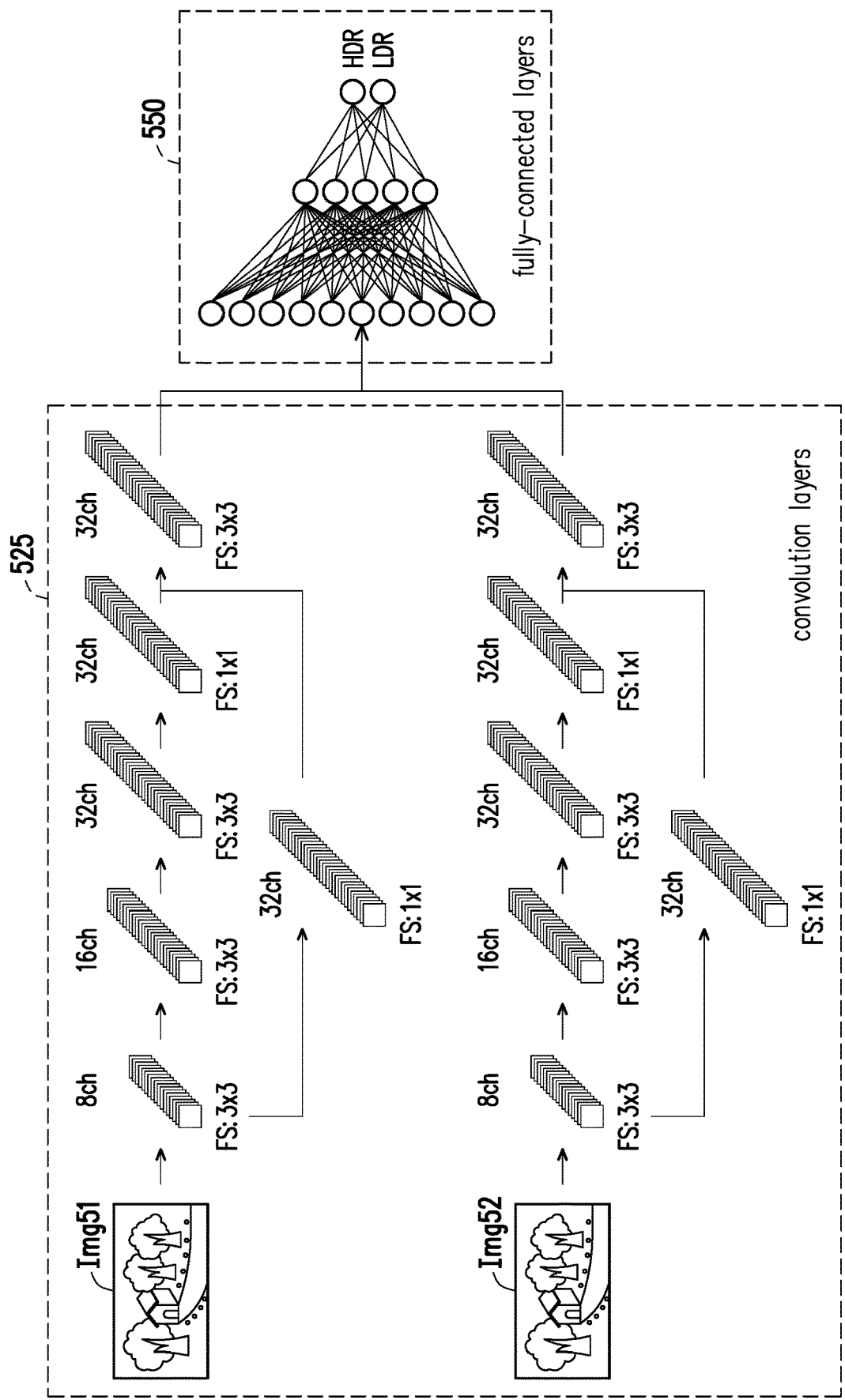
FIG. 5 illustrates a functional diagram to describe an architecture of an HDR classifier in accordance with an exemplary embodiment of the disclosure.

FIG. 5 illustrates a functional diagram to describe an architecture of an HDR classifier in accordance with an exemplary embodiment of the disclosure.

Referring to FIG. 5, an input image Img51 and another input image Img52 are inputted into convolution layers 525 with a filter size (e.g., 3×3) and various channels (e.g., 8ch to 32ch) for feature extraction and fully-connected layers 550 for HDR and LDR classification. As an example, if the input image Img51 is classified as an HDR image with a probability of 70% and an LDR image with a probability of 30%, then the 30% could be the reward value of the loss function. Also, if the input image Img51 is more likely to be an HDR image than the input image Img52, the reward value given to the input image Img51 is lower than that given to the input image Img52.

Figure 6:
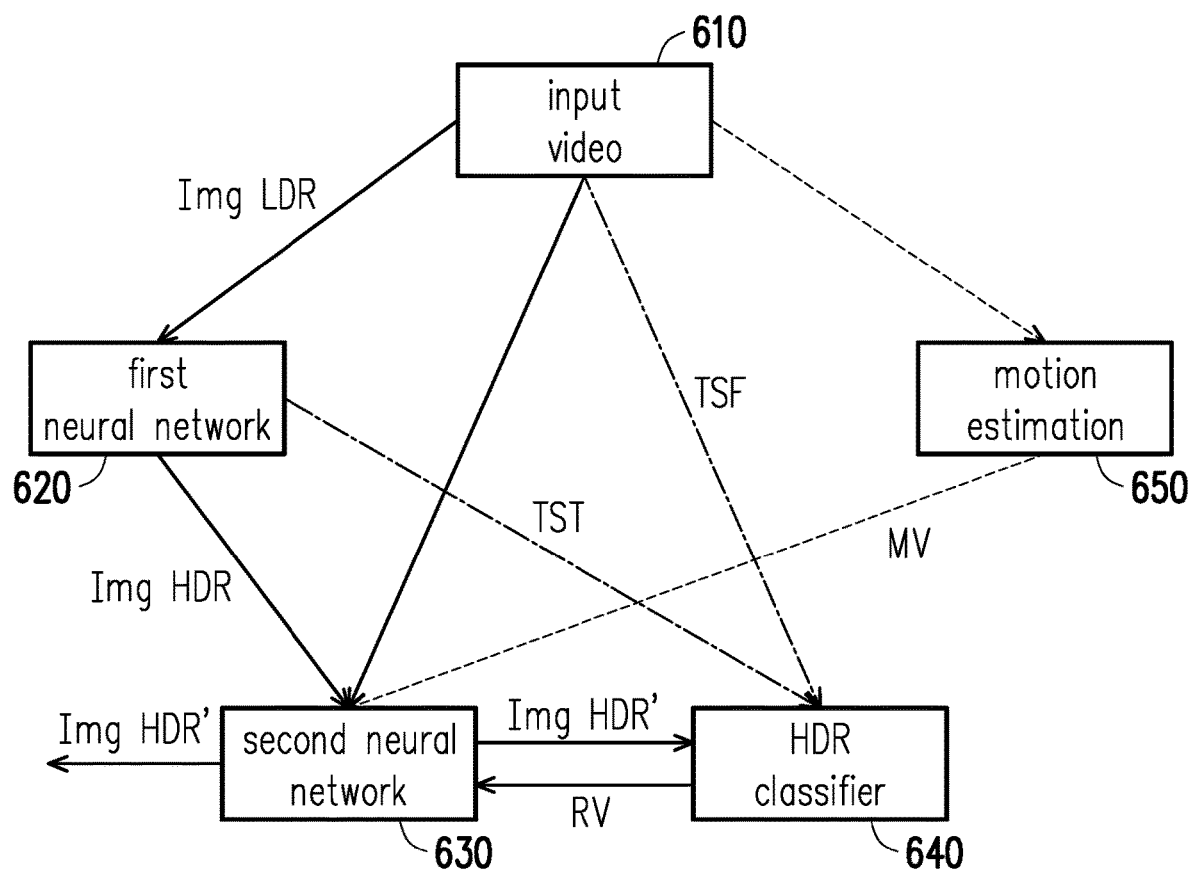
FIG. 6 illustrates a functional diagram of a proposed training method for video stabilization in accordance with one of the exemplary embodiments of the disclosure.

The proposed training method for video stabilization could be extended to a functional diagram in accordance with another one of the exemplary embodiments of the disclosure as illustrated in FIG. 6.

Referring to FIG. 6, an input video 610 including LDR images ImgLDR is received and converted to HDR images ImgHDR by using a first neural network 620. A second neural network 630 for video stabilization would be trained according to the LDR images ImgLDR and the HDR images ImgHDR to generate stabilized HDR images ImgHDR' in a time-dependent manner. Also, an HDR classifier 640 may be trained based on the LDR images as a training set TSF and HDR images TST as a training set TST. The stabilized HDR images ImgHDR' would be inputted to the HDR classifier 640 for reward values RV, and only the stabilized HDR images ImgHDR' with high reward values would be outputted. Motion estimation 650 would be optionally performed on the LDR images ImgLDR to generate the stabilized HDR images ImgHDR in a more precise fashion. Details of FIG. 6 may refer to related descriptions as presented previously and would not be repeated herein for brevity's sake.

In view of the aforementioned descriptions, the proposed method and image processing device provide a technique to train a neural network architecture to produce stabilized videos. Moreover, the neural network architecture may also be extended and applicable to a decoded video for tone-mapping to produce an HDR video with reduced flickering on a TV display or applicable to a camera with a low-resolution CCD sensor to produce an HDR video.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A training method for video stabilization, comprising:
receiving an input video comprising a plurality of low dynamic range (LDR) images;
converting the LDR images to a plurality of high dynamic range (HDR) images by using a first neural network; and
training a second neural network for video stabilization according to the LDR images and the HDR images to generate a plurality of stabilized HDR images in a time-dependent manner;
wherein the step of training the second neural network for video stabilization according to the LDR images and the HDR images to generate the stabilized HDR images in the time-dependent manner comprises:
performing a feature extraction process to obtain features based on the LDR images and the HDR images; and
training the second neural network for video stabilization based on a loss function by minimizing a loss value of the loss function, wherein the loss value of the loss function depends upon he features;
wherein the features comprise:
features of at least one non-current LDR image adjacent to a current LDR image of the LDR images; and
features of at least one non-current HDR image adjacent to a current HDR image of the HDR images,
wherein the current HDR image corresponds to the current LDR image.

2. The method according to claim 1, wherein the step of generating the stabilized HDR images in the time-dependent manner comprises:
performing a deflickering process on the HDR images according to the LDR images.

3. The method according to claim 1, wherein in the deflickering process, the HDR images have a flickering degree in positive correlation with a flickering degree of the LDR images.

4. The method according to claim 1, wherein the features indicate a difference between image variation of the LDR images and image variation of the HDR images.

5. The method according to claim 1, wherein the loss value has a positive correlation with a degree of the difference.

6. The method according to claim 1 further comprising:
constructing an HDR classifier according to the LDR images and the HDR images; and
classifying the stabilized HDR images by using the HDR classifier to generate a reward value, wherein the loss value of the loss function further depends upon the reward value.

7. The method according to claim 6, wherein the reward value indicates whether the stabilized HDR images have LDR characteristics.

8. The method according to claim 7, wherein the loss value is higher when the stabilized HDR images have lower HDR characteristics than the LDR images.

9. The method according to claim 1, wherein the loss value of the loss function further depends upon a similarity of the stabilized HDR images to the HDR images.

10. The method according to claim 9, wherein the loss function has a negative correlation with a degree of the similarity of the stabilized HDR images to the HDR images.

11. An image processing device comprising:
a memory circuit, configured to store data;
a processing circuit, configured to:
receive an input video comprising a plurality of low dynamic range (LDR) images;
convert the LDR images to a plurality of high dynamic range (HDR) images by using a first neural network; and
train a second neural network for video stabilization according to the LDR images and the HDR images to generate a plurality of stabilized HDR images in a time-dependent manner;
wherein the processing circuit
performs a feature extraction process to obtain features based on the LDR images and the HDR images and
trains the second neural network for video stabilization based on a loss function by minimizing a loss value of the loss function, wherein the loss value of the loss function depends upon the features;
wherein the features comprise:
features of at least one non-current LDR images adjacent to a current LDR image of the LDR images; and
features of at least one non-current HDR images adjacent to a current HDR image of the HDR images,
wherein the current HDR image corresponds to the current LDR image.

12. The image processing device according to claim 11, wherein the processing circuit performs a deflickering process on the HDR images according to the LDR images.

13. The image processing device according to claim 11, wherein in the deflickering process, the HDR images have a flickering degree in positive correlation with a flickering degree of the LDR images.

14. The image processing device according to claim 11, wherein the features indicate a difference between image variation of the LDR images and image variation of the HDR images.

15. The image processing device according to claim 11, wherein the loss value has a positive correlation with a degree of the difference.

16. The image processing device according to claim 11, wherein the processing circuit is further configured to:
construct an HDR classifier according to the LDR images and the HDR images; and
classify the stabilized HDR images by using the HDR classifier to generate a reward value, wherein the loss value of the loss function further depends upon the reward value.

17. The image processing device according to claim 16, wherein the reward value indicates whether the stabilized HDR images have LDR characteristics.

18. The image processing device according to claim 16, wherein the loss value is higher when the stabilized HDR images have lower HDR characteristics than the LDR images.

19. The image processing device according to claim 11, wherein the loss value of the loss function further depends upon a similarity of the stabilized HDR images to the HDR images.

20. The image processing device according to claim 19, wherein the loss function has a negative correlation with a degree of the similarity of the stabilized HDR images to the HDR images.

* * * * *